UNITED STATES PATENT OFFICE.

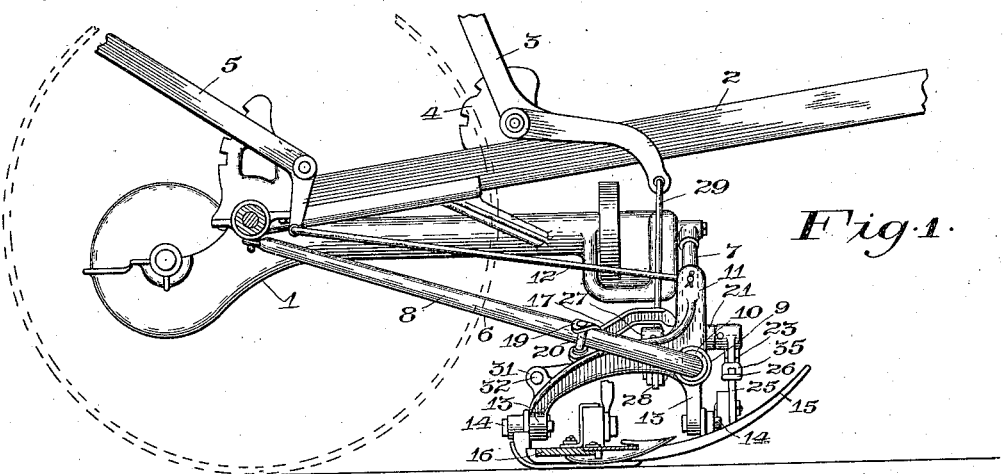
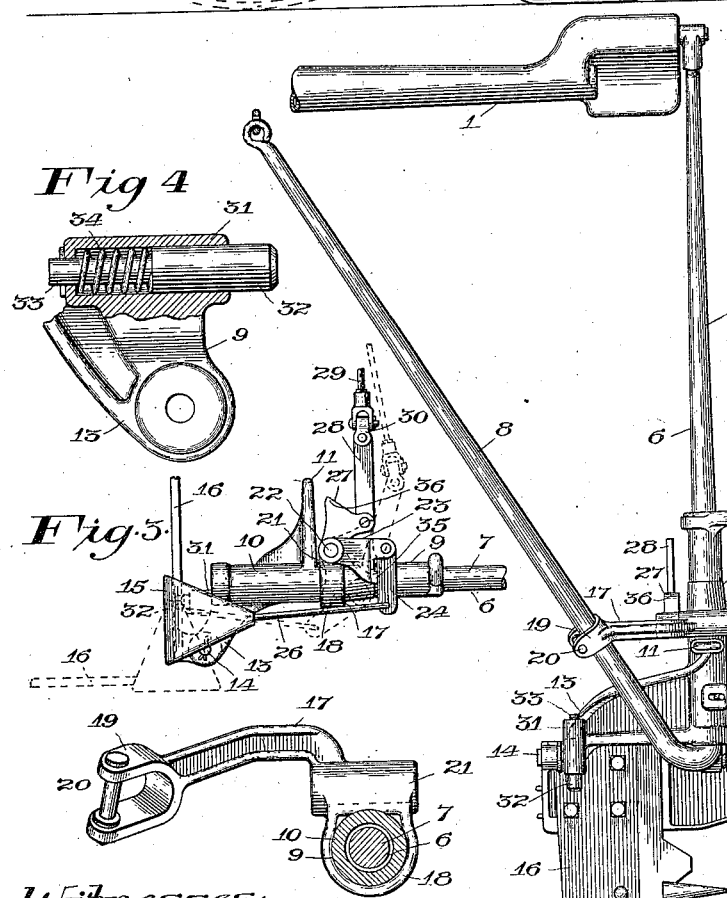

JOHN W. LATIMER, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,178,524.   Specification of Letters Patent.   Patented Apr. 11, 1916.

Application filed October 28, 1912. Serial No. 728,105.

*To all whom it may concern:*

Be it known that I, JOHN W. LATIMER, a citizen of the United States, residing at Chicago, in the county of Cook and State of Illinois, have invented certain new and useful Improvements in Mowing-Machines, of which the following is a specification.

My invention relates to mowing machines, and in particular to means for raising the finger bar about its pivotal connection with the coupling frame from a horizontal to a vertical position relative to the wheeled frame; the object of my invention being to provide a construction whereby such a result is attained in a direct and efficient manner by means of a mechanism comprising few parts, that may be easily assembled.

A further object of my invention is to provide improved operative connections whereby the yoke may be tilted without interference with the lifting mechanism for the finger bar and to provide improved means for cushioning the throw of the finger bar as it approaches a vertical position through the operation of the lifting lever in one direction, and insuring the return thereof to a horizontal position when the lifting lever is moved in an opposite direction.

I attain these objects by means of mechanism, one embodiment of which is illustrated in the accompanying drawings, in which—

Figure 1 represents a side elevation of part of a mowing machine having my invention embodied in its construction; Fig. 2 is a top plan view of part of Fig. 1; Fig. 3 is a front elevation of part of Figs. 1 and 2 and designed to illustrate the manner of mounting a part of the finger bar controlling mechanism upon the coupling yoke; Fig. 4 is a fragmentary part of the mechanism, partly in section, on an enlarged scale, and designed to illustrate the construction of the spring buffer mechanism that engages with the finger bar as it approaches a vertical position; and Fig. 5 is a detached detail of a bracket member forming part of the finger bar controlling mechanism.

Like reference numerals designate like parts throughout the several views.

1 represents a part of the main frame of the machine, 2 the draft tongue, 3 the lifting lever mechanism mounted upon the draft tongue and coöperating with the notched sector 4 in a common way to hold the cutting apparatus in an adjusted position, 5 the tilting lever pivotally mounted upon the frame of the machine.

6 represents a common form of coupling frame having the front member 7 thereof arranged at right angles with the line of draft of the machine and having its stubbleward end pivotally connected with the frame of the machine in a manner permitting the grainward end thereof to be raised or lowered in a vertical plane, and a rearwardly and stubblewardly inclined member 8 having its rear end also pivotally connected with the main frame.

9 represents a coupling yoke having a sleeve portion 10 whereby the yoke is mounted upon the member 7 of the coupling frame in a manner permitting a rocking movement of the yoke thereon, the sleeve 10 having integral therewith a vertically arranged arm 11 that is connected with the tilting lever 5 by means of a link 12. The yoke 9 includes the downwardly extending hangers 13 having openings therein arranged parallel with the line of draft of the machine and adapted to receive the coupling pins 14 whereby the yoke is pivotally connected with the inner shoe 15 forming part of the cutting apparatus of the machine, and 16 represents the finger bar having the inner end thereof secured to said shoe; all of the above enumerated parts being common in the class of machines indicated and not of my invention.

17 represents a bracket member having an eye portion 18 at the front end thereof adapted to loosely receive the sleeve 10, and a stirrup member 19 at its rear end that is adapted to be clamped to the member 8 of the coupling frame by means of a bolt 20.

21 represents a sleeve member integral with the bracket, arranged parallel with the line of draft of the machine and in substantially a horizontal plane, having opposite ends thereof upon opposite sides of the axis of the sleeve 10.

22 represents a shaft received by the sleeve member 21 and adapted to rock therein. Secured to the front end of said shaft is an arm 23 having one end of a link 24 pivotally connected therewith, the opposite end of the link being connected with a vertically arranged ear 25 integral with the shoe 15 by means of a link 26, and 27 represents an arm secured to the opposite end of shaft 22.

28 represents a link having one end pivotally connected with the arm 27 and the opposite end thereof connected with one end of a link 29 by means of a clevis member 30, the connection between the two links being such as to permit a limited universal movement thereof in their coöperative relations. The opposite end of link 29 is pivotally connected with the lifting lever 3.

31 represents a barrel member integral with the yoke 9 at the rear end thereof and adapted to slidably receive a plunger 32 that is provided with a reduced portion 33, and 34 represents a compression spring encircling the reduced portion and operative between one end of the barrel and the plunger in a manner to yieldingly project the plunger in a grainward direction and within the path of the finger bar when it is raised to a vertical position. The arm 23 is provided with a snubbing portion 35 that is adapted to engage with the link 24 during part of the operative movement thereof, and the arm 27 is provided with a like snubbing portion 36 that engages with the link 28 during a part of its operative movement.

When it is desired to raise the finger bar to a vertical position the operator will pull the upper end of the lifting lever 3 rearward, such movement, through the link connections therewith, rocking the shaft 22, and through the link connection 24 between arm 23 and ear 25, the power is directed in a manner to raise the finger bar. During the initial movement rearward of the lifting lever the link 28 is in the position shown by dotted lines in Fig. 3, with one edge thereof contacting with the snubbing portion 36 of arm 27; the result being that the power is directed first to raise the grainward end of the finger bar and the coupling frame, and as the link 28 and arm 27 move toward the position shown by full lines in Fig. 3, the power is directed in a manner to raise the finger bar to a vertical position and against the plunger 32. Since the plunger in sliding stubbleward moves the force of spring 34, when the lifting lever is thrown forward to lower the finger bar, the force of this spring 34 is directed against the finger bar in a manner causing the latter to swing outward until, by gravity, it will fall to a horizontal position. It will also be noted that in my improved construction the tilting mechanism for the bar 16 is operable entirely independently of the lifting mechanism therefor, the sleeve 10 of the yoke being freely turnable in the eye portion 18 of the bracket 17.

While I have in this application specifically described one embodiment which my invention may assume in practice, it is to be understood that the form chosen is used for purposes of illustration and that the invention may be embodied in other forms without departing from its spirit, it being my intention to include all such forms within the scope of the appended claims.

What I claim as being my invention, and desire to secure by Letters Patent, is:

1. In a mowing machine, a frame, a lifting lever pivoted thereon, a coupling frame also pivotally connected thereto, a yoke rotatably mounted on said coupling frame, a bracket carried on said coupling frame in which said yoke is rotatable, a shoe operatively connected to said yoke, and means for adjusting said shoe journaled in said bracket and operatively connected to said lifting lever and said shoe.

2. In a mowing machine, a frame, a coupling frame, a yoke rotatably mounted thereon, a bracket carried on said coupling frame having a portion thereof through which said yoke extends, a shoe operatively connected to said yoke, and means journaled in said bracket and operatively connected to said shoe whereby said shoe may be adjusted independently of a rocking movement of said yoke.

3. In a mowing machine, a frame, a coupling frame pivotally mounted thereon, a bracket rigidly attached to said coupling frame, a shaft journaled in said bracket and disposed parallel to the line of draft, a lever on said main frame, a yoke journaled on said coupling frame, a shoe operatively connected to said yoke, and lever mechanism between the opposite ends of said shaft and said lever and shoe.

4. In a mowing machine, a frame, lever mechanism pivoted thereon, a coupling frame pivotally connected to said main frame, a finger bar pivotally connected to said coupling frame, a longitudinally disposed shaft journaled on said coupling frame, a snubbing member carried upon one end of said shaft, link connections between said snubbing member and said lifting lever, a coöperating snubbing member carried on the opposite end of said shaft, and link connections between said member and said finger bar.

5. In a mowing machine, a main frame, a lifting lever pivoted thereon, a coupling frame pivotally connected to said main frame, a finger bar operatively connected to said coupling frame, a longitudinally disposed shaft journaled on said coupling frame, a substantially triangular shaped snubbing member carried on one end of said shaft and operatively connected to said lifting lever, and a coöperating substantially triangular shaped snubbing member carried on the opposite end of said shaft and operatively connected to said finger bar.

6. In a mowing machine, a coupling frame, a longitudinally disposed shaft journaled thereon, a short link carried on one end of said shaft having a laterally disposed snubbing portion, a relatively longer link pivotally connected to said short link and engageable by the snubbing portion thereof, a coöperating short link carried on the opposite end of said shaft likewise having a laterally extending snubbing portion, and a second link pivotally connected to said coöperating snubbing link.

7. In a mowing machine, the combination of a main frame, a coupling frame operatively connected thereto, a yoke operatively connected to said coupling frame, a finger bar operatively connected to said yoke, an operating lever for said finger bar, connecting means between said operating lever and said finger bar whereby the latter may be raised and lowered, and a member through which said connecting means passes having a loose connection with said yoke to permit the rocking of said yoke upon the coupling frame independent of the finger bar actuating mechanism.

8. In a mowing machine, the combination of a main frame, a coupling frame operatively connected to said main frame, a yoke operatively connected to said coupling frame, a finger bar hinge-joined to said yoke, means for raising and lowering said finger bar about its pivot, and a bracket, said raising and lowering means being journaled in said bracket and said bracket being rigidly joined to the coupling frame and joined to said yoke whereby said yoke may be rocked upon the coupling frame independent of the finger bar actuating mechanism.

9. A mowing machine including, in combination, a main frame, a coupling frame including a member having one end thereof pivotally connected with said main frame and movable about its pivot in a transverse plane relative to the line of draft of the machine, a yoke adapted to rock about the axis of said coupling member, a shoe pivotally connected with said yoke, the axis thereof being parallel with the line of draft of the machine, a finger bar secured to said shoe, means for swinging said finger bar about the axis thereof and raising and lowering said coupling frame, said means including a lifting lever carried by said main frame, a rock shaft journaled in a bearing carried by said yoke and arranged parallel with the line of draft of the machine, arms secured to opposite ends of said shaft and disposed upon opposite sides of the axis of said yoke, said arms being provided with snubbing portions, a link connection between one of said arms and said lifting lever and between the remaining arm and said shoe, said snubbing portions engaging with the respective link connections during a part of the rocking movement of said shaft.

10. A mowing machine including, in combination, a main frame, a coupling frame including a member having one end thereof pivotally connected with said main frame and movable about its pivot in a transverse plane relative to the line of draft of the machine, a yoke adapted to rock about the axis of said coupling member, a shoe pivotally connected with said yoke, the axis thereof being parallel with the line of draft of the machine, a finger bar secured to said shoe, means for swinging said finger bar about the axis thereof and raising and lowering said coupling frame, said means including a lifting lever carried by said main frame, a rock shaft journaled in a bearing carried by said yoke and arranged parallel with the line of draft of the machine, arms secured to opposite ends of said shaft and disposed in front and rear of the axis of said yoke, said arms being provided with snubbing portions, a link connection between said rear arm and said lifting lever, and a link connection between said front arm and said shoe, said snubbing portions adapted to engage respectively with the rear and front link connections during a part of the finger bar raising movement of said mechanism.

11. A mowing machine including, in combination, a main frame, a coupling frame including a transverse member arranged at right angles with the line of draft of the machine and having the stubbleward end thereof pivotally connected with said main frame and movable about its pivot in a vertical plane, and a diagonally arranged member extending rearward and stubbleward and having the rear end thereof pivotally connected with said main frame, a yoke provided with a sleeve portion receiving the transverse member of said coupling frame and adapted to rock about the axis thereof, a shoe pivotally connected with said yoke, the axis thereof being parallel with the line of draft of the machine, a finger bar secured to said shoe, means for swinging said finger bar about the axis thereof and raising and lowering said coupling frame, said means including a lifting lever carried by said main frame, a bracket member having one end thereof loosely mounted upon said yoke, its opposite end secured to the diagonal member of said coupling frame, a rock shaft journaled in a bearing carried by said bracket member and arranged parallel with the line of draft of the machine, arms secured to opposite ends of said shaft, and link connections between one of said arms and said lifting lever and between said remaining arm and said shoe.

JOHN W. LATIMER.

Witnesses:
J. J. O'CONNOR,
E. J. TEUFEL.

Copies of this patent may be obtained for five cents each, by addressing the "Commissioner of Patents, Washington, D. C."